US011742973B2

(12) United States Patent
Angeli

(10) Patent No.: US 11,742,973 B2
(45) Date of Patent: Aug. 29, 2023

(54) MULTI-PROTOCOL SYNCHRONIZATION

(71) Applicant: Apple Inc., Cupertino, CA (US)

(72) Inventor: Alessandro Angeli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 17/320,119

(22) Filed: May 13, 2021

(65) Prior Publication Data

US 2022/0103279 A1  Mar. 31, 2022

Related U.S. Application Data

(60) Provisional application No. 63/083,801, filed on Sep. 25, 2020.

(51) Int. Cl.
*H04J 3/06* (2006.01)

(52) U.S. Cl.
CPC .................... *H04J 3/0667* (2013.01)

(58) Field of Classification Search
CPC ............ H04L 27/2655; H04L 27/2656; H04L 27/2689; H04J 3/0635; H04J 3/0638; H04J 3/0667
See application file for complete search history.

(56) References Cited

U.S. PATENT DOCUMENTS

| 9,158,375 | B2 | 10/2015 | Maizels et al. |
| 9,383,582 | B2 | 7/2016 | Tang et al. |
| 9,488,488 | B2 | 11/2016 | Waldman |
| 9,685,004 | B2 | 6/2017 | Wang et al. |
| 11,381,375 | B1* | 7/2022 | Byagowi ............ G06F 13/382 |
| 2016/0065322 | A1 | 3/2016 | Cao et al. |

(Continued)

FOREIGN PATENT DOCUMENTS

| CN | 107864148 A | 3/2018 |
| CN | 107888314 A | 4/2018 |
| WO | 2014105264 | 7/2014 |

OTHER PUBLICATIONS

Mills et al., "NetworkTime Protocol Version 4: Protocol and Algorithm Specification," Internet Engineering Task Force (IETF), ISSN: 2070-1721, Jun. 2010 (Year: 2010).*

(Continued)

*Primary Examiner* — Brian P Cox
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to maintaining a first reference clock for a first local area network (LAN). The first reference clock is usable by a first set of computing devices coupled to the first LAN to participate in a shared experience with a second set of computing devices coupled to a second LAN. A computing system synchronizes, via a first time synchronization protocol, the first reference clock with a global reference clock accessible to the computing system over a wide area network (WAN). The computing system provides, via a second time synchronization protocol, a time value of the first reference clock to one of the first set of computing devices to coordinate an event in the shared experience with one of the second set of computing devices, where the second time synchronization protocol has a precision that is greater than a precision of the first time synchronization protocol.

18 Claims, 5 Drawing Sheets

(56) References Cited

U.S. PATENT DOCUMENTS

| | | |
|---|---|---|
| 2016/0203648 A1 | 7/2016 | Bilbrey et al. |
| 2017/0134499 A1* | 5/2017 | Moyer ............. H04N 21/43076 |
| 2018/0062780 A1* | 3/2018 | Shimizu ............... H04N 21/242 |
| 2019/0007726 A1 | 1/2019 | Anderson |
| 2020/0312005 A1 | 10/2020 | Desai et al. |
| 2021/0191898 A1* | 6/2021 | Khan .................. G06F 15/7896 |
| 2021/0400611 A1* | 12/2021 | Petrus ................ H04W 56/0015 |
| 2022/0114993 A1* | 4/2022 | Nordin ................. G10H 1/0033 |

OTHER PUBLICATIONS

IEEE Standard fora Precision Clock Synchronization Protocol for Networked Measurement and Control Systems, Technical Committee on Sensor Technology (TC-9), IEEE Std 1588-2019 (Year: 2019).*

International Search Report and Written Opinion in PCT Appl. No. PCT/US2021/050387 dated Jan. 4, 2022, 14 pages.

* cited by examiner

MULTI-PROTOCOL SYNCHRONIZATION

The present application claims priority to U.S. Prov. Appl. No. 63/083,801, filed Sep. 25, 2020, which is incorporated by reference herein in its entirety.

BACKGROUND

Technical Field

This disclosure relates generally to computing devices and, more specifically, to synchronizing the internal clocks of computing devices over a computing network.

Description of the Related Art

Computing devices in communication with one another may be operating within the same local area network or may be operating across a wide area network. Communication between these devices in either situation may be dependent on synchronized time and may become skewed if the timing across these devices is not synchronized.

DETAILED DESCRIPTION

Current synchronization techniques attempting to synchronize timing between various devices assume that device interaction is one of two types: a group of devices local to one another (e.g., within the same local area network (LAN)) and, therefore, able to achieve a high synchronization accuracy or a group of devices distributed non-locally (e.g., are located across a wide area network (WAN)) such that they use global synchronization (which may only be achieved via lower synchronization accuracy). In the first type, a precision time protocol (PTP) may be utilized, while in the second type a network time protocol (NTP) may be utilized. In such traditional techniques, it is often assumed that all devices within a group require the same synchronization accuracy and that discontinuities in time (e.g., due to infrequent adjustments) are acceptable. Unfortunately, because certain devices participating in the group may not be local to one another and, therefore, are not able to achieve the same level of synchronization accuracy. This may limit the accuracy of the local devices and often may require special distribution systems.

In contrast, in the embodiments disclosed herein, a multi-protocol synchronization system is proposed to allow devices within local groups to synchronize themselves using a high-precision mechanism (e.g., PTP) while these local groups can then globally synchronize with one another using a less precise synchronization mechanism (e.g., NTP). Additionally, the disclosed techniques provide for smearing time adjustments temporarily to account for discontinuities between a local clock (used by a local group of devices) and a global clock (used by various groups at different locations).

Example Multi-Protocol Synchronization System

Figure 1:
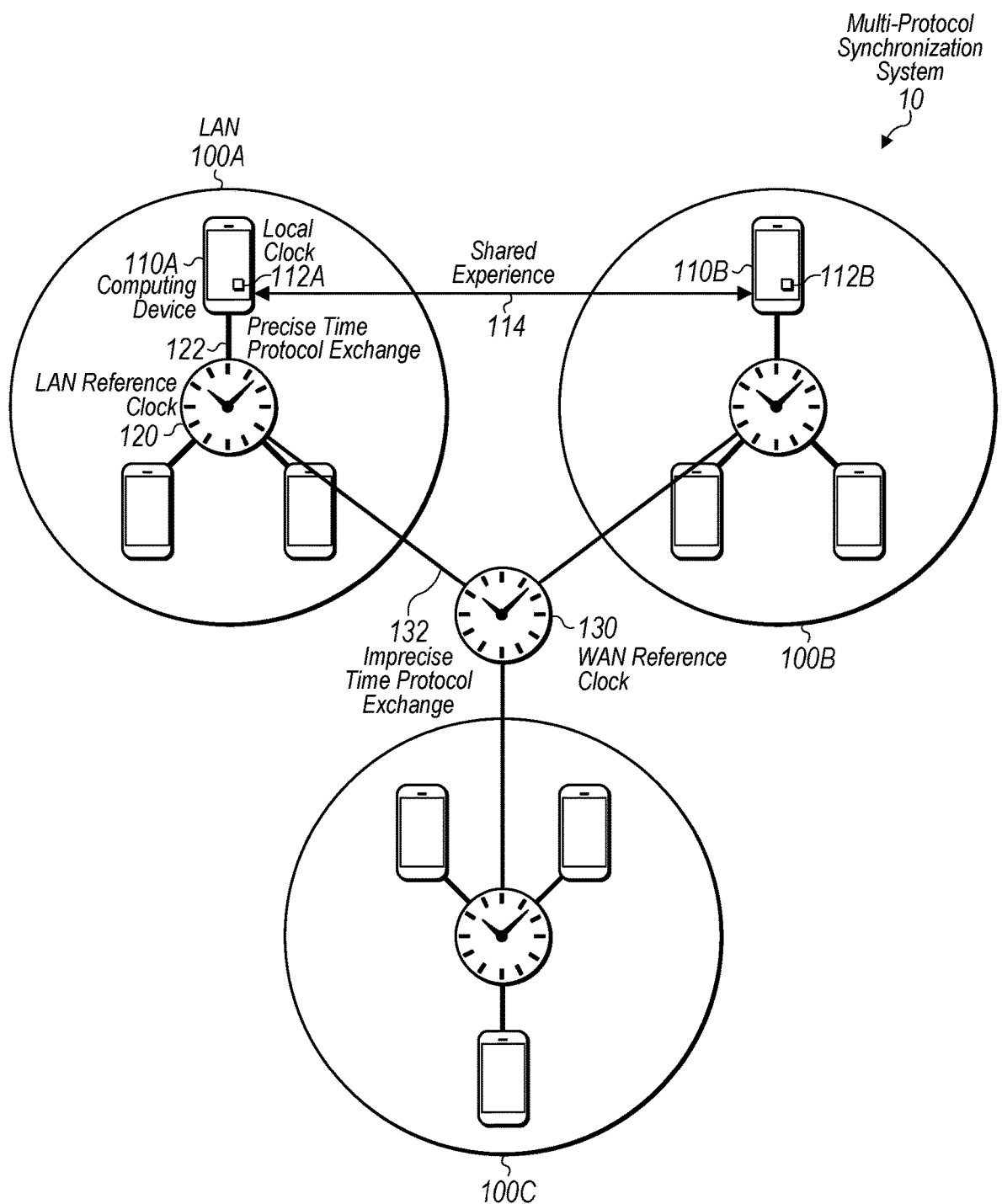
FIG. 1 is a block diagram illustrating an example multi-protocol synchronization system, according to some embodiments.

FIG. 1 is a block diagram illustrating an example multi-protocol synchronization system. In the illustrated embodiment, system 10 includes various local area networks (LANs) 100, which in turn include groups of computing devices 110 and LAN reference clocks 120, and a wide area network reference clock 130.

In the illustrated embodiment, various groups of computing devices 110 operating within respective LANs 100 participate in a shared experience 114. In some embodiments, a shared experience 114 may be perceived by users of computing devices 110 within an extended reality (XR) environment. A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

In some embodiments, computing devices 110 may be head mounted displays (HMDs), which generate and present XR content to users wearing the HMDs. These head mounted displays may provide three-dimensional views that are perceived by users wearing the head mounted displays. In other embodiments, computing devices 110 may be vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. This experience may be shared as users may be able to interact with one another, events occurring in the XR environment may be coordinated so that they occur simultaneously on devices 110, etc. Other examples of a shared experience 114 may include streaming a movie, participating in a conference call, listening to audio, watching a video, playing a video game, etc.

While, in some instances, devices 110 participating in a shared experience 114 may be within their LAN, computing devices 110, in other instances, may participate in the experience with devices 110 across a wide area network (WAN). In order for the computing devices 110 to present coordinated content at a similar time to other computing devices 110 (either in their LAN or across the WAN), these devices may need to synchronize their internal clocks with one another. Users presented with coordinated content may be viewing content from the same environment, but from different perspectives, for example. In some situations, coordinated content presented to two different users may be nearly identical (e.g., if two users are watching the same movie together from their separate homes in different locations). As will be discussed, in some embodiments, a time value provided by a global reference clock is usable by local reference clocks of LANs to coordinate occurrences of events (e.g., rendering of items) within an XR environment for different groups of computing devices across a WAN.

As shown, the synchronization of the internal clocks of computing devices 110 is performed via multiple synchronization exchanges. In the illustrated embodiment, both a precise time protocol exchange 122 and an imprecise time protocol exchange 132 are utilized to perform synchronization. The precise time protocol may be a precision time protocol (PTP), while the imprecise time protocol exchange may be a network time protocol (NTP). Although various examples herein discuss the use of both PTP and NTP in synchronization methods, these examples are discussed for purposes of explanation and are not intended to limit the scope of the present disclosure. In other embodiments, any of various synchronization protocols may be implemented.

In the illustrated embodiment, computing devices 110 within LAN 100A participate in an exchange to synchronize their local clocks 112 with a LAN reference clock 120 using a precise time protocol. Computing devices within LAN 100B and 100C perform similar synchronization with reference to their respective LAN reference clocks 120. In some embodiments, LAN reference clocks 120 are distinct devices from computing devices 110. In other embodiments, system 10 may select one of devices 110 to use its internal clock 112 as the LAN reference clock 120 for the other devices 110 on that LAN 100. For example, system 10 may calculate a set of metrics for each of the three computing devices 110 included in LAN 100A. The sets of metrics for these devices may include a metric indicating a reliability of a particular computing device 110 to access WAN reference clock 130. This metric may indicate whether this computing device 110 has access to a reliable global reference clock. For example, some computing devices 110 within LAN 100A may have access to a GPS, while others do not. As one specific example, system 10 may choose a computing device within LAN 100A that has a reliable network time protocol (NTP) source even if this device does not portray exceptional metrics relative to other computing devices within the LAN 100A. Once a computing device 110 has been selected as the local reference clock for LAN 100A, all other devices within this LAN synchronize their clocks to this clock using precise time protocol exchange 122.

In addition to computing devices 110 synchronizing with other devices in their respective LAN 100 via their respective LAN reference clocks 120, in the illustrated embodiment, LAN reference clocks 120 synchronize with WAN reference clock 130 using an imprecise time protocol exchange 132. Reference clock 130 may generally be a reference clock that is external to one or more of LANs 100 and thus may be accessible over a WAN connection, such as a connection to the Internet, 4G/5G connection, etc.—thus, usage of the term "WAN" with respect to clock 130 is not intended to be overly limiting but rather to contrast clock 130 with clocks 120. WAN reference clock 130 may correspond to any of various timing sources such as a remote server, global positioning system (GPS), cell tower, atomic clock, etc. Although a single reference clock 130 is shown in FIG. 1, in some embodiments, reference clock 130 may be one of multiple references clocks 130 being evaluated for synchronization by LAN reference clocks 120. WAN reference clock 130 may also be referred to herein as a "global reference clock" as it is a reference clock for other references clocks (i.e., LAN reference clocks 120, which are reference clocks for local clocks 112). For example, a global reference clock may be maintained by a server in Austin, Tex. and be accessed across a WAN by various computing devices in LANs located within Texas or elsewhere. To synchronize with WAN reference clock 130 using the imprecise time protocol, in the illustrated embodiment, a LAN reference clock 120 sends a request for a time value over the WAN. In some embodiments, this request may include an original timestamp indicating a time value of the LAN reference clock 120, for example. A response to the request may then include receiving a timestamp indicating a time at which the request was received at WAN reference clock 130 and a transmission timestamp indicating a time value of the WAN reference clock 130 at transmission of the response. In such an embodiment, the former timestamp may be used to account for a propagation delay and be used to adjust the latter timestamp.

In some situations, a time value of one LAN reference clock 120 may differ from another LAN reference clock 120, which may result in devices 110 in different LANs 100 having different local times—potentially interfering with a shared experience 114 among those devices. In the illustrated embodiment, this issue may be addresses with LAN reference clocks 120 synchronizing with WAN reference clock 130—and thus synchronizing with one another. In other situations, a time value obtained from WAN reference clock 130 may differ from a time value of a LAN reference clock 120 (e.g., due to drift upwards or downwards). And, this difference may be by an amount (e.g., fifty milliseconds) that produces a noticeable difference in the content being presented on computing devices 110 if an abrupt time adjustment is made by LAN reference clock 120 (such as clock 120 merely adopting the received time value received from WAN reference clock 130 as its own).

To prevent an abrupt time adjustment by LAN reference clock 120, in some embodiments, system 10 implements smearing techniques. Specifically, when system 10 determines that a time specified by LAN reference clock 120 differs from a time specified by WAN reference clock 130, system 10 temporarily causes alteration of a frequency of LAN reference clock 120 used by computing devices in a LAN 100. In some embodiments, the length of temporary alteration is determined based on both an amount of time that the LAN clock differs from the WAN clock and an adjustment threshold at which distortion of content presented via the computing devices 110 becomes perceptible to users participating in shared experience 114. For example, the amount of time that differs between the LAN clock and the WAN clock may be several seconds. The adjustment threshold is set such that users viewing a shared experience will not be able to perceive the smearing. For example, if the shared experience 114 includes viewing a video, the length of time may be selected such that the rate of adjustment does not cause the video to become distorted. In some situations, smearing at too great a frequency will cause perceptible distortion in both audio (e.g., pitch changes) as well as video (e.g., a user may perceive "skipping" or buffering in a video). Altering the frequency of the LAN reference clock (i.e., smearing) causes the timing of this clock to become synchronized with the timing of the WAN reference clock in smoother manner.

In various embodiments, the frequency (or rate) that a LAN reference clock 120 is adjusted is determined experimentally by selecting different speeds and observing the effect on altered content on various different devices. For example, large speed changes may be more noticeable on devices with inferior hardware. Once an appropriate smearing rate is known, this rate and the amount of time differing between LAN reference clock 120 and WAN reference clock 130 are used to calculate a time interval over which the smearing should be performed in order to synchronize the two clocks. For example, the rate of speed up may be upwards of 5% faster during smearing.

In many instances, the disclosed multi-protocol synchronization techniques may advantageously allow users across various different networks to participate in a consistent and synchronized shared experience such that these users experience content in a coordinated, synchronous manner. In addition, the disclosed smearing techniques may decrease the amount of time necessary for various computing devices to become synchronized while maintaining an acceptable user experience. These synchronization techniques may be particularly beneficial for shared XR experiences as those experiences may be time sensitive due to a user's sensitivity to latency and jitter. For example, in some instances, latency and jitter may not only make interactions between users difficult but also induce discomfort and disorientation for users—making the shared XR experience untenable.

Example Local Reference Clock

Figure 2:
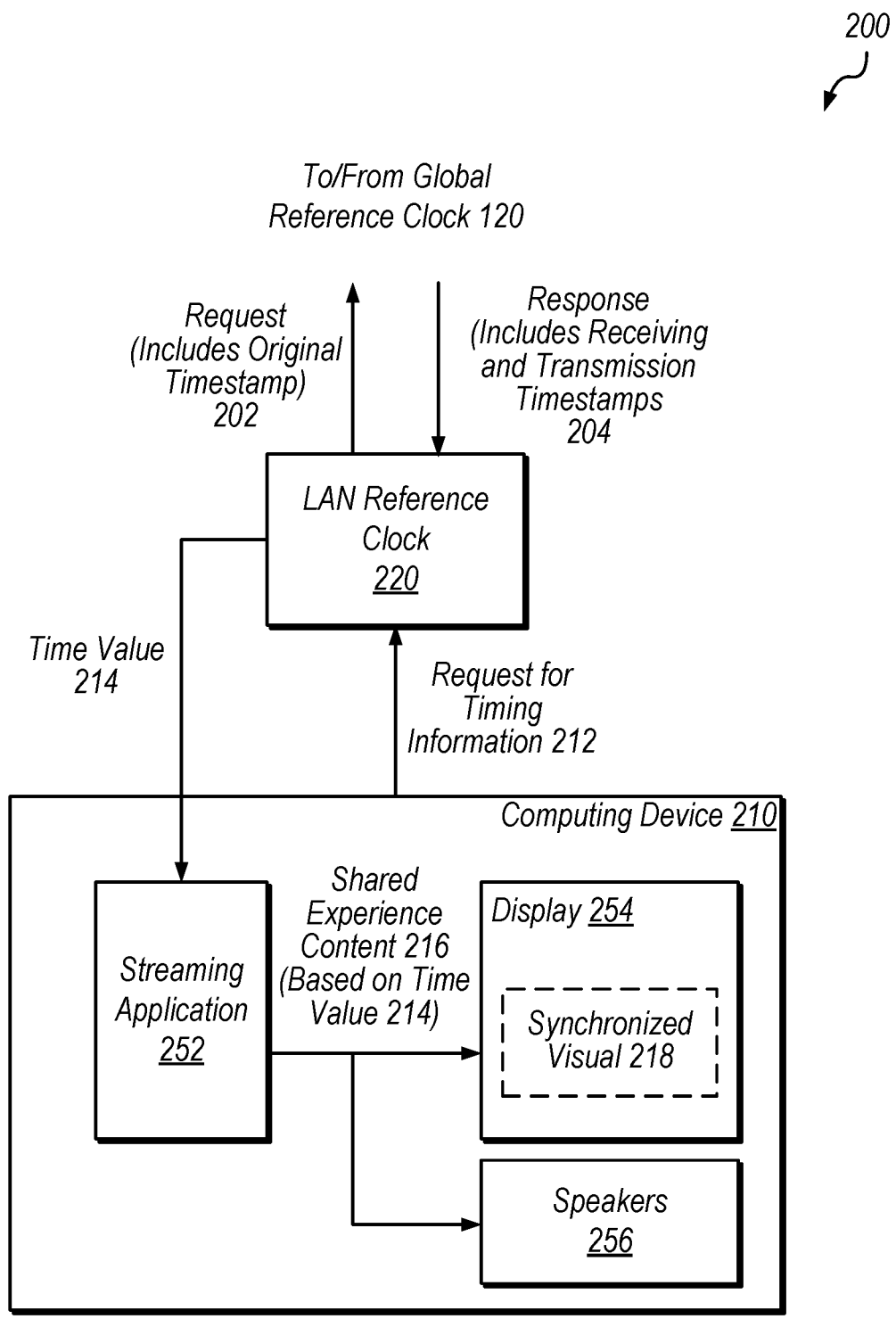
FIG. 2 is a block diagram illustrating an example synchronization of a computing device with a local reference clock, according to some embodiments.

FIG. 2 is a block diagram illustrating an example synchronization of a computing device with a local reference clock. In the illustrated embodiment, system 200 includes a computing device 210 and a LAN reference clock 220.

Computing device 210, in the illustrated embodiment, includes a streaming application 252, a display 254, and speakers 256. Computing device 210 sends a request 212 for timing information to a LAN reference clock 220. This LAN reference clock 220, in turn, sends a request 202, which includes an original timestamp, to a global reference clock (e.g., global reference clock 130 discussed above with reference to FIG. 1). The global reference clock sends a response 204 with receiving and transmission timestamps. The LAN reference clock 220 performs a synchronization with the global reference clock based on the response 204 using an imprecise timing protocol. LAN reference clock 220, in the illustrated embodiment, then provides a time value 214 to a streaming application of computing device 210.

Streaming application 252, in the illustrated embodiment, provides shared experience content 216 to display 254 and speakers 256 based on the time value 214 received from LAN reference clock 220. Display 254 then presents a synchronized visual 218 to a user, such that this visual is synchronized with a visual presented to other users participating in the shared experience with the user of computing device 210. Similarly, speakers 256 provide audio to the user which is synchronized based on time value 214 as well.

Figure 3A:
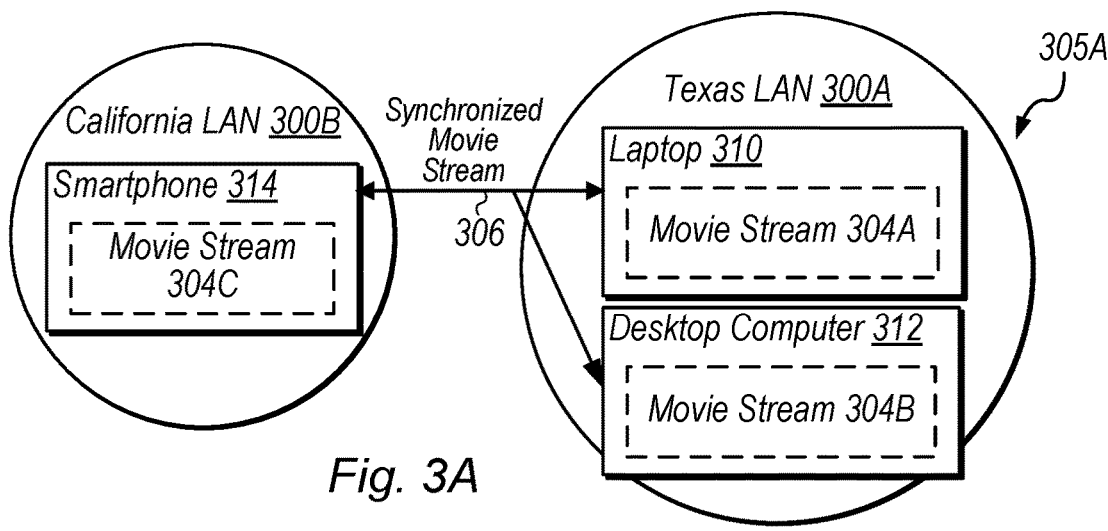
FIGS. 3A-3C are block diagrams illustrating example synchronization scenarios, according to some embodiments.
Figure 3B:
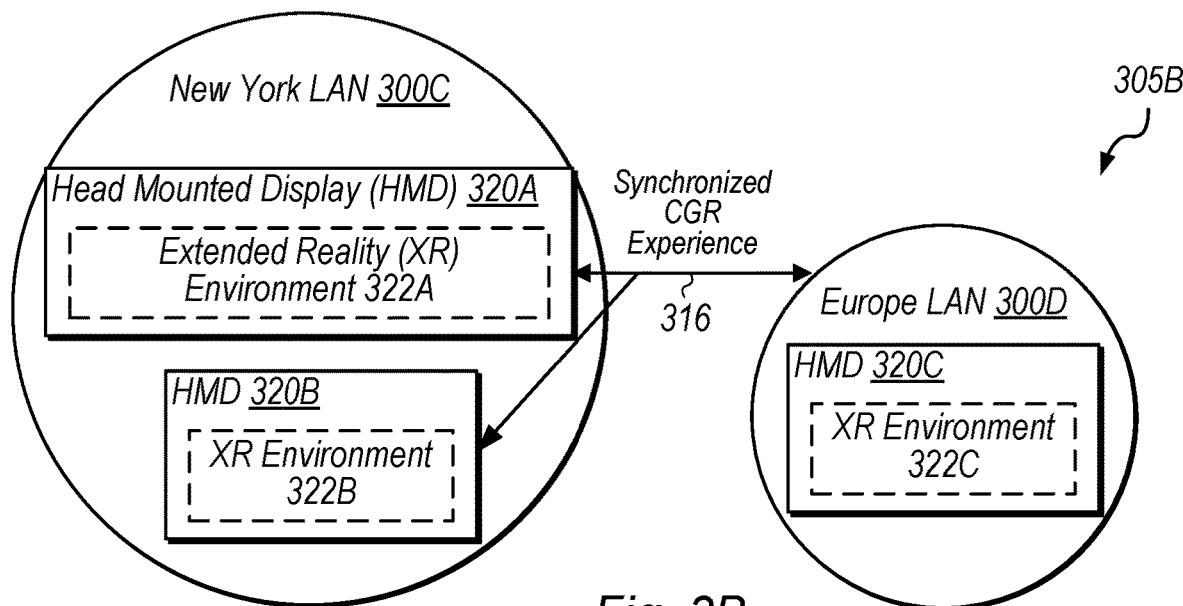
Figure 3C:
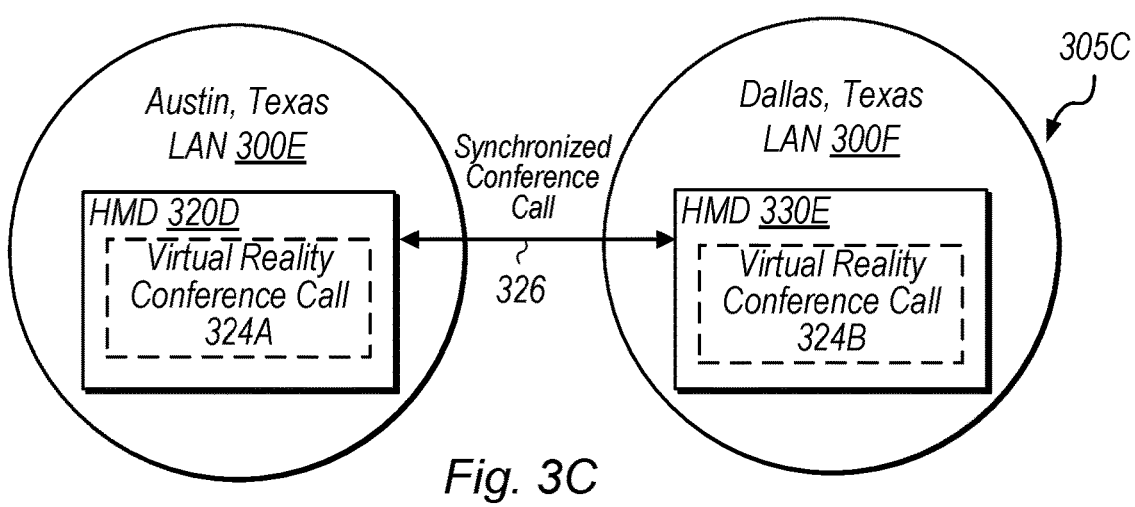

FIGS. 3A-3C are block diagrams illustrating example synchronization scenarios. In the illustrated embodiment, FIG. 3A shows an example 305A of synchronizing a shared movie stream 306 between two LANs over a WAN, FIG. 3B shows an example 305B of synchronizing a shared XR experience 316, and FIG. 3C shows an example 305C of synchronizing a shared conference call 326.

In FIG. 3C, for example, users wearing HM 320D and 330E may be participating in a conference call in which users are represented using avatars sitting around a room talking. When a particular user represented as a dinosaur avatar speaks, the mouth of the dinosaur moves in unison with the user's mouth. This type of conference call may be referred to as a virtual reality conference call.

Example Method

Figure 4:
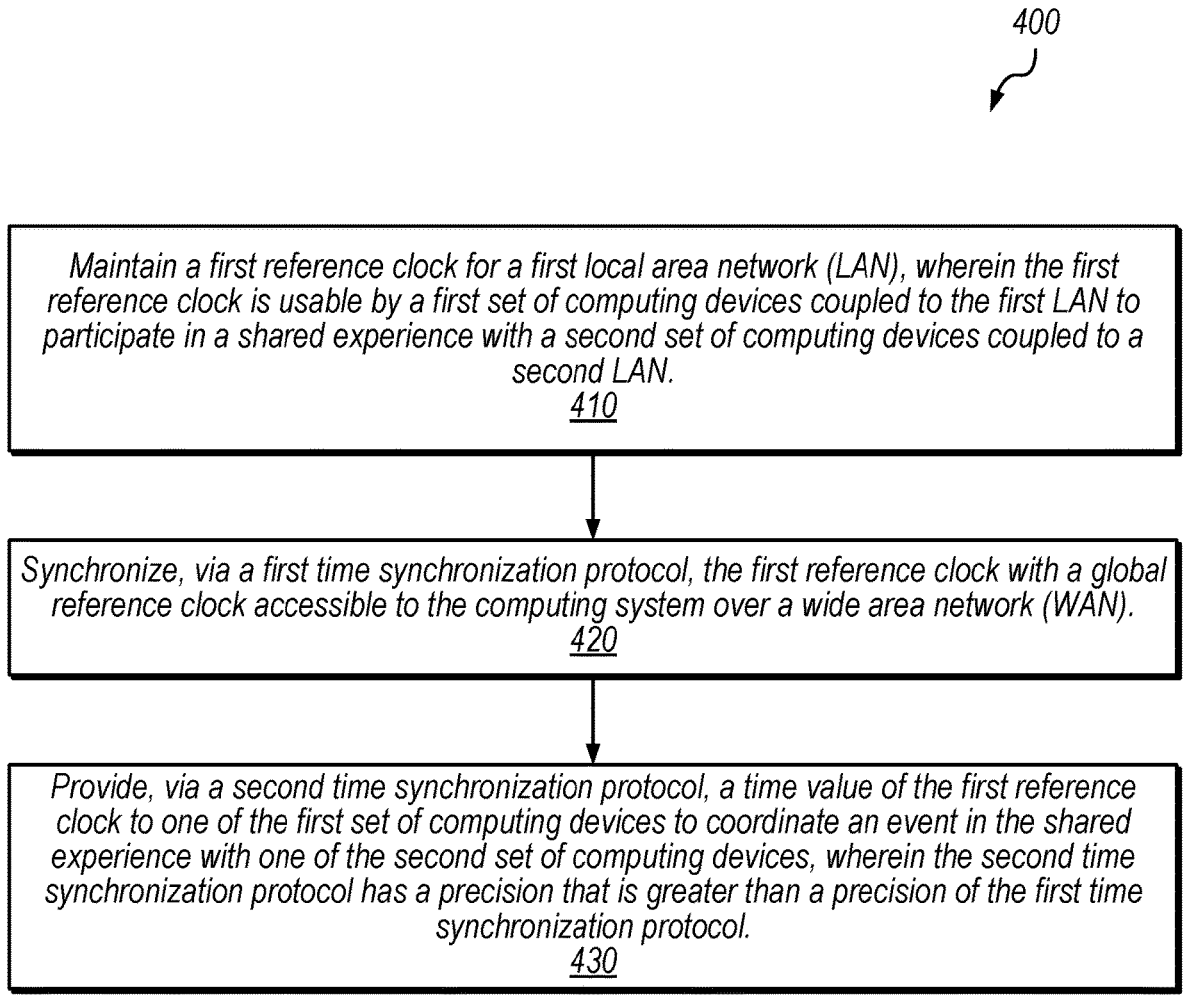
FIG. 4 is a flow diagram illustrating a method for synchronizing two groups of devices coupled to different local area networks in communication over a wide area network using two different time synchronization protocols, according to some embodiments.

FIG. 4 is a flow diagram illustrating a method for synchronizing two groups of devices coupled to different local area networks in communication over a wide area network using two different time synchronization protocols, according to some embodiments. The method shown in FIG. 4 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 410, in the illustrated embodiment, a computing system maintains a first reference clock for a first local area network (LAN), wherein the first reference clock is usable by a first set of computing devices coupled to the first LAN to participate in a shared experience with a second set of computing devices coupled to a second LAN.

At 420, the computing system synchronizes, via a first time synchronization protocol, the first reference clock with a global reference clock accessible to the computing system over a wide area network (WAN).

Figure 5:
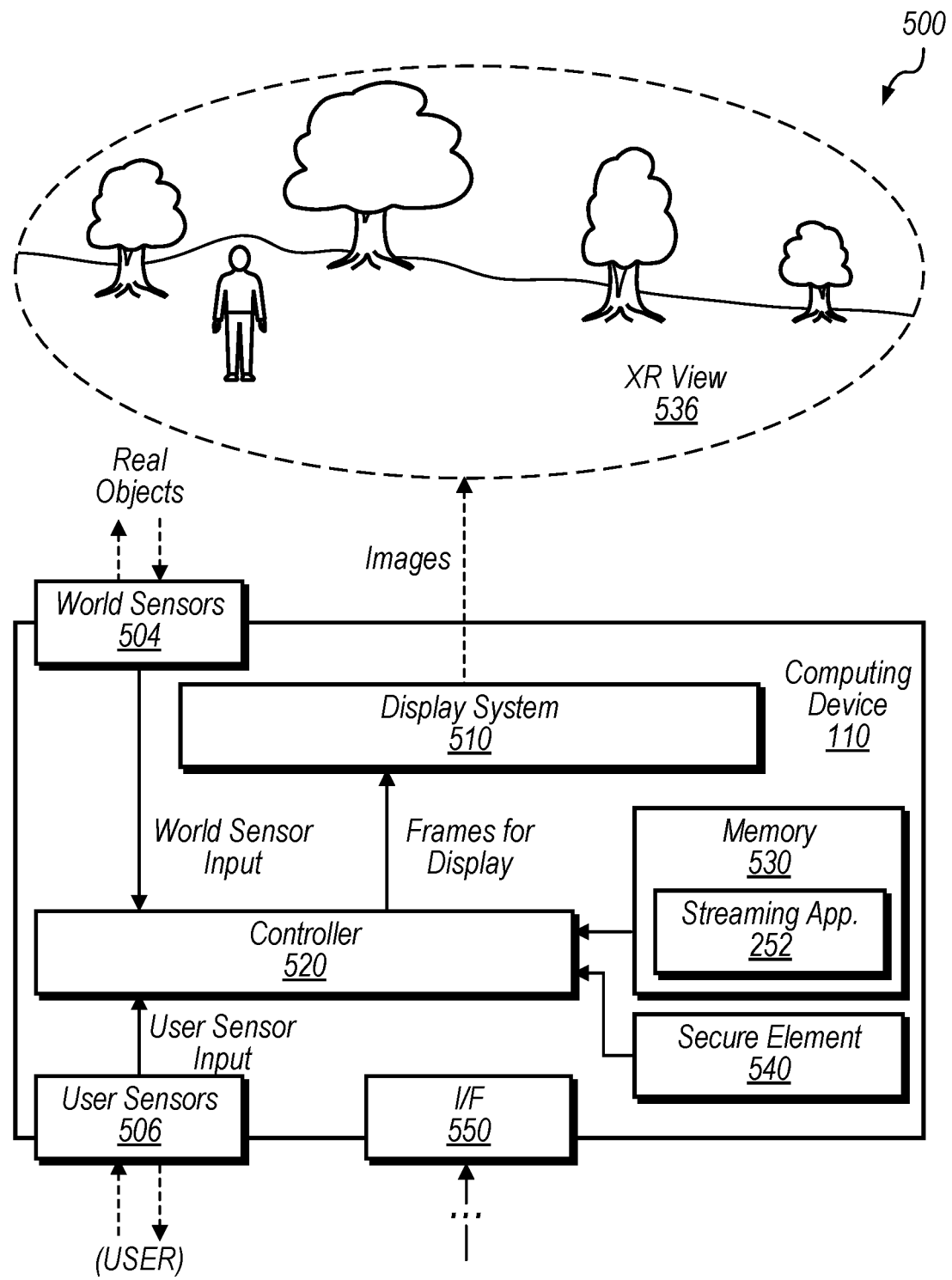
FIG. 5 is a block diagram illustrating an exemplary computing device, according to some embodiments.

At 430, the computing system provides, via a second time synchronization protocol, a time value of the first reference clock to one of the first set of computing devices to coordinate an event in the shared experience with one of the second set of computing devices, wherein the second time synchronization protocol has a precision that is greater than a precision of the first time synchronization protocol Example Computing Device Turning now to FIG. 5, a block diagram of components within a computing device 110, is depicted. In some embodiments, device 110 is configured to be worn on the head and to display content, such as an XR view 536, to a user. For example, device 110 may be a headset, helmet, goggles, glasses, a phone inserted into an enclosure, etc. worn by a user. Device 110, however, may correspond to other devices in other embodiments, which may include one or more of components 504-550. In the illustrated embodiment, device 110 includes world sensors 504, user sensors 506, a display system 510, controller 520, memory 530, secure element 540, and a network interface 550.

Display system 510, in various embodiments, is configured to display rendered frames to a user. Display system 510 may implement any of various types of display technologies such as digital light processing (DLP), liquid crystal display (LCD), liquid crystal on silicon (LCoS), or light-emitting diode (LED). As another example, display system 510 may include a direct retinal projector that scans frames including left and right images, pixel by pixel, directly to the user's eyes via a reflective surface (e.g., reflective eyeglass lenses). To create a three-dimensional effect in view 502, objects at different depths or distances in the two images are shifted left or right as a function of the triangulation of distance, with nearer objects shifted more than more distant objects. Display system 510 may support any medium such as an optical waveguide, a hologram medium, an optical combiner, an optical reflector, or any combination thereof. In some embodiments, display system 510 may be the transparent or translucent and be configured to become opaque selectively. In some embodiments, display system 510 may implement display 254 discussed above.

Controller 520, in various embodiments, includes circuitry configured to facilitate operation of device 110. Accordingly, controller 520 may include one or more processors configured to execute program instructions, such as streaming application 252, to cause device 110 to perform various operations described herein. These processors may be CPUs configured to implement any suitable instruction set architecture, and may be configured to execute instructions defined in that instruction set architecture. For example, in various embodiments controller 520 may include general-purpose or embedded processors implementing any of a variety of instruction set architectures (ISAs), such as ARM, x86, PowerPC, SPARC, RISC, or MIPS ISAs, or any other suitable ISA. In multiprocessor systems, each of the processors may commonly, but not necessarily, implement the same ISA. Controller 520 may employ any microarchitecture, including scalar, superscalar, pipelined, superpipelined, out of order, in order, speculative, non-speculative, etc., or combinations thereof. Controller 520 may include circuitry to implement microcoding techniques. Controller 520 may include one or more levels of caches, which may employ any size and any configuration (set associative, direct mapped, etc.). In some embodiments, controller 520 may include at least GPU, which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 520 may include one or more other components for processing and rendering video and/or images, for example image signal processors (ISPs), coder/decoders (codecs), etc. In some embodiments, controller 520 may be implemented as a system on a chip (SOC).

Memory 530, in various embodiments, is a non-transitory computer readable medium configured to store data and program instructions executed by processors in controller 520 such as streaming application 252. Memory 530 may include any type of volatile memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. Memory 530 may also be any type of non-volatile memory such as NAND flash memory, NOR flash memory, nano RAM (NRAM), magneto-resistive RAM (MRAM), phase change RAM (PRAM), Racetrack memory, Memristor memory, etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Secure element (SE) 540, in various embodiments, is a secure circuit configured perform various secure operations for device 110. As used herein, the term "secure circuit" refers to a circuit that protects an isolated, internal resource from being directly accessed by an external circuit such as controller 520. This internal resource may be memory that stores sensitive data such as personal information (e.g., biometric information, credit card information, etc.), encryptions keys, random number generator seeds, etc. This internal resource may also be circuitry that performs services/operations associated with sensitive data such as encryption, decryption, generation of digital signatures, etc. For example, SE 540 may maintain one or more cryptographic keys that are used to encrypt data stored in memory 530 in order to improve the security of device 110. As another example, secure element 540 may also maintain one or more cryptographic keys to establish secure connections between cameras 516, storage, etc., authenticate device 110 or a user of device 110, etc. As yet another example, SE 540 may maintain biometric data of a user and be configured to perform a biometric authentication by comparing the maintained biometric data with biometric data collected by one or more of user sensors 506. As used herein, "biometric data" refers to data that uniquely identifies the user among other humans (at least to a high degree of accuracy) based on the user's physical or behavioral characteristics such as fingerprint data, voice-recognition data, facial data, iris-scanning data, etc.

Network interface 550, in various embodiments, includes one or more interfaces configured to communicate with external entities such as other devices 110, LAN reference clock 120, and/or WAN reference clock 130. Network interface 550 may support any suitable wireless technology such as Wi-Fi®, Bluetooth®, Long-Term Evolution™, etc. or any suitable wired technology such as Ethernet, Fibre Channel, Universal Serial Bus™ (USB) etc. In some embodiments, interface 550 may implement a proprietary wireless communications technology (e.g., 60 gigahertz (GHz) wireless technology) that provides a highly directional wireless connection. In some embodiments, device 110 may select between different available network interfaces based on connectivity of the interfaces as well as the particular user experience being delivered by device 110. For example, if a particular user experience requires a high amount of bandwidth, device 110 may select a radio supporting the proprietary wireless technology when communicating wirelessly to stream higher quality content. If, however, a user is merely a lower-quality movie, Wi-Fi® may be sufficient and selected by device 110. In some embodiments, device 110 may use compression to communicate in instances, for example, in which bandwidth is limited.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure I.e., something physical))). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed. FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

In this disclosure, various "modules" operable to perform designated functions are discussed herein. As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

What is claimed is:

1. A non-transitory computer-readable medium having program instructions that are executable by a computing system to cause the computing system to perform operations comprising:
   maintaining a first reference clock for a first local area network (LAN), wherein the first reference clock is usable by a first set of computing devices coupled to the first LAN to participate in a shared experience with a second set of computing devices coupled to a second LAN;
   synchronizing, via a first time synchronization protocol, the first reference clock with a global reference clock accessible to the computing system over a wide area network (WAN), wherein the synchronizing includes:
      determining that a time specified by the first reference clock differs from a time specified by the global reference clock; and
      temporarily causing, based on the determining, alteration of a frequency of the first reference clock, wherein a length of the temporary alteration is determined based on an adjustment threshold at which distortion of content presented via computing devices in the first set of computing devices becomes perceptible to a user; and
   providing, via a second time synchronization protocol, a time value of the first reference clock to one of the first set of computing devices to coordinate an event in the shared experience with one of the second set of computing devices, wherein the second time synchronization protocol has a precision that is greater than a precision of the first time synchronization protocol.

2. The non-transitory computer-readable medium of claim 1, wherein the computing system is one of the first set of computing devices, and wherein the operations further comprise:
   generating, by the computing system, content of an extended reality (XR) environment in which the first set of computing devices is located; and
   presenting the generated content to a user of the computing system based on a time value of the first reference clock, wherein devices in the first set of computing devices are configured to display matching generated content at a similar time based on the time value of the first reference clock.

3. The non-transitory computer-readable medium of claim 1, wherein synchronizing via the first time synchronization protocol includes:
   sending, to a computer system maintaining the global reference clock over the WAN, a request for a global time value, wherein the request includes an original timestamp indicating a time value of the first reference clock; and
   receiving, from the computer system over the WAN, a response to the request, wherein the response includes a receiving timestamp indicating a time at which the request was received by the computer system and a transmission timestamp indicating a time value of the global reference clock at transmission of the response; and
   wherein the synchronization of the first reference clock allows computing devices in the first and second sets of computing devices to coordinate occurrences of events within an extended reality (XR) environment.

4. The non-transitory computer-readable medium of claim 1, wherein maintaining the first reference clock includes:
   calculating a set of metrics for respective ones of the first set of computing devices, wherein the set of metrics include a metric indicating a reliability of a computing device to access the global reference clock; and
   selecting, based on the calculating, a computing device included in the first set of computing devices for use as the first reference clock.

5. The non-transitory computer-readable medium of claim 1, wherein the first time synchronization protocol is a network time protocol (NTP), and wherein the second time synchronization protocol is a precision time protocol (PTP).

6. The non-transitory computer-readable medium of claim 1, wherein the first reference clock is configured to use the first time synchronization protocol in response to satellite-based timing information being available to the first reference clock.

7. The non-transitory computer-readable medium of claim 1, wherein devices in the first and second sets of computing devices are head mounted displays, and wherein the head mounted displays provide three-dimensional views that are perceived by users wearing the head mounted displays.

8. A method, comprising:
   sending, by a computing device of a first set of computing devices participating in a shared experience with a second set of computing devices, a request for timing information, wherein the first set of computing devices is coupled to a first local area network (LAN), and wherein the second set of computing devices is coupled to a second LAN; and
   receiving, by the computing device from a computing system maintaining a reference clock, a time value for synchronizing a local clock of the computing device;
   wherein the computing system is configured to access a global reference clock over a wide area network (WAN) for synchronizing the reference clock with the global reference clock via a first time synchronization protocol, wherein the synchronizing of the reference clock includes:
      determining that a time specified by the reference clock differs from a time specified by the global reference clock; and
      temporarily causing, based on the determining, alteration of a frequency of the reference clock used by the first set of computing devices, wherein a length of the temporary alteration is determined based on an adjustment threshold at which distortion of content presented via computing devices in the first set of computing devices becomes perceptible to a user; and wherein the time value is received via a second time synchronization protocol having a precision that is greater than a precision of the first time synchronization protocol.

9. The method of claim 8, wherein the computing device is a head mounted display, and wherein the shared experience includes an extended reality (XR) environment, and wherein the time value is usable by the computing system to coordinate occurrences of events within the XR environment for the first and second sets of computing devices.

10. The method of claim 8, wherein the computing system maintains the reference clock by:
calculating a set of metrics for respective ones of the first set of computing devices, wherein the set of metrics include a metric indicating a reliability of a computing device to access the global reference clock; and
selecting, based on the calculating, a computing device included in the first set of computing devices for use as the reference clock.

11. The method of claim 8, wherein the first time synchronization protocol is a network time protocol (NTP), and wherein the second time synchronization protocol is a precision time protocol (PTP).

12. The method of claim 8, wherein the reference clock is configured to use the first time synchronization protocol in response to satellite-based timing information being available to the reference clock.

13. The method of claim 8, wherein synchronizing via the first time synchronization protocol includes:
sending, to a computer system maintaining the global reference clock over the WAN, a request for a global time value, wherein the request includes an original timestamp indicating a time value of the reference clock; and
receiving, from the computer system over the WAN, a response to the request, wherein the response includes a receiving timestamp indicating a time at which the request was received by the computer system and a transmission timestamp indicating a time value of the global reference clock at transmission of the response; and
wherein the synchronization of the reference clock allows computing devices in the first and second sets of computing devices to coordinate occurrences of events within a computer-generated reality (CGR) environment.

14. A method, comprising:
receiving, by a computer system from a first set of computing devices coupled to a first local area network (LAN), a request for a timing component, wherein the first set of computing devices is participating in a shared experience with a second set of computing devices coupled to a second LAN, and wherein the request is sent over a wide area network (WAN) using a first time synchronization protocol; and
transmitting, by the computer system to the first set of computing devices, a time value, wherein the time value specifies a current time of a global reference clock maintained by the computer system;
wherein the first set of computing devices is configured to access, over the first local area network (LAN), a local reference clock maintained for the first set of computing devices for synchronizing local clocks of computing device in the first set of computing devices, wherein a frequency of the local reference clock is altered based on the time value for a length of time determined based on an adjustment threshold at which distortion of content presented via computing devices in the first set of computing devices becomes perceptible to a user; and
wherein the accessing the local reference clock is performed using a second time synchronization protocol having a precision that is greater than a precision of the first time synchronization protocol.

15. The method of claim 14, wherein the shared experience includes generating an extended reality (XR) environment, and wherein the time value is used to coordinate occurrences of events within the XR environment.

16. The method of claim 15, wherein a frequency at which events within the XR environment are presented is up to 5% faster than an original presentation frequency associated with the events within the XR environment.

17. The method of claim 14, wherein devices in the first set of computing devices are configured to present, according to the timing component, an extended reality (XR) environment based on recorded content of a physical environment in which the devices in the first set of computing devices are located.

18. The method of claim 14, wherein the first and second sets of computing devices are head mounted displays, and wherein the head mounted displays provide three-dimensional views that are perceived by users wearing the head mounted displays.

* * * * *